Patented Dec. 27, 1949

2,492,927

UNITED STATES PATENT OFFICE 2,492,927

SULFOLANYL ETHERS AND ETHER-ESTERS

Seaver A. Ballard, Orinda, and Rupert C. Morris, Berkeley, Calif., assignors to Shell Development Company, San Francisco, Calif., a corporation of Delaware No Drawing. Application October 4, 1946, Serial No. 701,095

8 Claims. (Cl. 260—329)

This invention relates to a novel and particularly useful class of sulfolanyl ethers and ether-esters. More particularly the invention pertains to sulfolanyl ethers and ether-esters of 2-methyl-2,4-pentanediol.

It is an object of the present invention to provide a new class of chemical compounds. A further object of the invention is to provide a class of compounds with unexpected properties of such a nature as to enable the compounds to be used in a great many industrial applications. Other objects and advantages of the invention will be apparent from the following detailed description thereof.

The novel compounds of the invention are distinguished from the ethers and ether-esters of cyclic sulfones known heretofore in that they comprise sulfolanyl ethers and ether-esters containing within their molecule a 2-methyl-2,4-dioxypentane group. It has been found that the novel sulfolanyl ethers and ether-esters possess novel and particularly useful properties, attributable to the presence within the compound of the 2-methyl-2,4-dioxypentane structure, which enable the utilization of these compounds in fields of application in which the ethers and ether-esters of cyclic sulfones known heretofore have been either inapplicable or lacking in providing to a sufficient degree the function demanded of them. Thus the properties possessed to a peculiar degree by the compounds of the invention render them of particular value as high boiling plasticizers and softening agents for synthetic rubbers. They are also of excellent value as plasticizers for resins such as the polyvinyl chloride and nitrocellulose type resins. The compounds of the present invention are especially valuable as insecticides and fungicides and can be used as components in a great many insecticidal and fungicidal compositions. Among other fields of application are their use as selective solvents and extractants, and as addition agents in the production of films, coatings, varnishes, paints, lacquers, and the like. They also can be used as components in hydraulic fluids and lubricating oils.

The novel compounds of the invention comprise broadly the sulfolanyl ethers and ether-esters of 2-methyl-2,4-pentanediol. More particularly the compounds may be described as substituted or unsubstituted cyclic sulfones which are directly joined to a hydroxy oxygen atom of a molecule of 2-methyl-2,4-pentanediol which is joined through the other hydroxy oxygen atom to a member of the group consisting of hydrogen, an organic radical or a $$-\underset{\underset{O}{\|}}{C}-R$$

radical, where R is an organic radical.

A particularly preferred group of the novel compounds of the invention comprise those sulfolanyl ethers and ether-esters wherein the cyclic sulfone is directly joined to the oxygen atom of the hydroxy group attached to the carbon atom number four of 2-methyl-2,4-pentanediol. The preferred compounds can be more fully described by the following general structural formula:

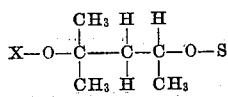

wherein X is a hydrogen atom, an organic radical, or the

radical (wherein R is an organic radical), and S is a substituted or unsubstituted sulfolanyl radical.

The cyclic sulfone referred to in the description of the novel compounds of the invention set forth hereinabove and represented by S in the above general structural formula of the preferred compounds is a five-membered heterocyclic ring consisting of four nuclear carbon atoms and a sulfonyl radical. The four nuclear carbon atoms have all their valences saturated. Such saturated cyclic sulfones are referred to herein as "sulfolanes." These compounds have also been termed "thiocyclopentane-1,1-dioxide," "thiolane-1,1-dioxide," "cyclo-tetramethylene sulfone" or "dihydrobutadiene sulfone." The saturated cyclic sulfone when attached to other groups through one of the bonds of the four nuclear carbon atoms is referred to herein as the "sulfolanyl radical." By the term "sulfolanyl radical" as employed in this specification and appended claims is meant the cyclic saturated sulfone radical, the structural formula of which is represented by:

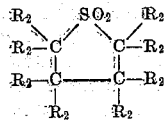

wherein one $R_2$ represents the free bond of the radical and the other $R_2$'s represent hydrogen atoms.

By the term "substituted sulfolanyl" radicals as employed in the specification and appended claims is meant the substituted cyclic saturated sulfone radicals having the following general structural formula:

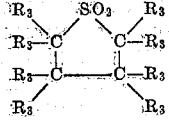

wherein one $R_3$ represents the free bond of the radical at least one of the other $R_3$'s represents a halogen atom or an organic radical, and the remaining $R_3$'s are hydrogen atoms.

The above described saturated cyclic sulfones can be prepared from unsaturated cyclic sulfones termed "sulfolenes." By the term "sulfolene" as employed herein is meant a five-membered heterocyclic ring consisting of four nuclear carbon atoms and a sulfonyl radical with a double bond between two of the nuclear carbon atoms. The sulfolenes may be represented by the formulas:

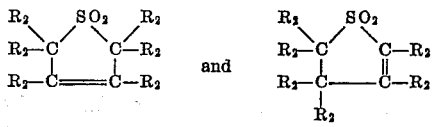

Sulfolenes may be prepared by reacting sulfur dioxide with the appropriate conjugated diolefinic compound at an elevated temperature. Such a reaction may be represented by the equation below showing the production of 2,4-dimethyl-3-sulfolene from 2-methylpentadiene:

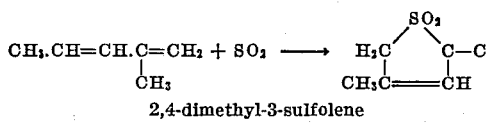

2,4-dimethyl-3-sulfolene

The isomeric 2-sulfolenes may be produced by treating the corresponding 3-sulfolenes with alkali.

The numbering system of the sulfolane or sulfolene ring is indicated below:

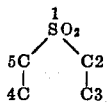

This is in accordance with the accepted system of numbering as exemplified by the compounds of this type of ring structure given on page 44 of Patterson and Capell, The Ring Index, Reinhold Publishing Corp., New York, 1940, Am. Chem. Soc. Monograph No. 84. The system of nomenclature used in describing the compounds of the present invention based upon the above is exemplified by the nomenclature of the compound having the following structure:

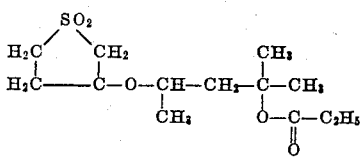

which is termed alpha,gamma-dimethyl-gamma-propionoxybutyl 3-sulfolanyl ether.

The halogen atoms which may be directly attached to one or more of the nuclear carbon atoms of the cyclic sulfone nucleus, as represented by $R_3$ of the above described structural formula for the cyclic sulfones, may be any halogen atom, but are preferably chlorine, bromine or iodine atoms, and more preferably the chlorine atoms.

The $R_3$ of the structural formula of the cyclic sulfones may also be an organic radical. Preferred organic radicals are the hydrocarbon radicals and the substituted hydrocarbon radicals. The more preferred of the two groups of radicals are the hydrocarbon radicals which may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Examples of the hydrocarbon radicals which may be attached to the nuclear carbon atoms are methyl, ethyl, propyl, isopropyl, n-butyl, isobutyl, sec-butyl, tert-butyl, n-pentyl, isopentyl, sec-pentyl, hexyl, n-octyl, isooctyl, cetyl, trimethyloctodecyl, allyl, methallyl, methyl vinyl carbinyl, butenyl, pentenyl, hexenyl, phenyl, naphthyl, anthryl, tolyl, xylyl, sec - butylnaphthyl, dipropylnaphthyl, cyclohexenyl, vinylcyclohexenyl, tributylcyclohexyl, cyclopentenyl, etc.

The substituted hydrocarbon radicals, represented by $R_3$, which may be attached to the sulfone nucleus are those wherein one or more hydrogen atoms of the above described hydrocarbon radicals has been replaced by an inorganic element or radical or by an organic radical containing one or more inorganic elements. Examples of the inorganic elements which may be directly attached to the hydrocarbon radicals are chlorine, bromine and iodine atoms, and the sulfate, sulfite, nitrate and nitrite radicals. Examples of the organic radicals, containing inorganic elements, that may be attached to the hydrocarbon radicals are the hydroxyl, carboxyl, acyl, ether, thioether, etc., radicals. The preferred group of the substituted hydrocarbon radicals are the halogen-substituted radicals such as chloromethyl, dichloroethyl, chlorobutyl, chloroallyl, bromoallyl, dichlorophenyl, chlorocyclohexenyl and the like and their homologues and analogues.

The radicals which the $R_3$ of the cyclic sulfone structural formula may represent also include the heterocyclic radicals in which an oxygen, nitrogen, sulfur, etc., atom or atoms is included in the ring system. Examples of such radicals are furfuryl, sulfolanyl, pyridinyl, and the like.

In the compounds of the present invention the radical joined to the hydroxy oxygen atom not attached to the cyclic sulfone radical, represented by X in the structural formula of the preferred compounds, may be an organic radical. Preferred organic radicals are the hydrocarbon radicals and substituted hydrocarbon radicals containing from 1 to 20 carbon atoms. The preferred hydrocarbon radicals may be cyclic or acyclic, saturated, unsaturated or aromatic. Representative examples of such hydrocarbon radicals are methyl, propyl, isopropyl, butyl, isobutyl, sec-butyl, n-pentyl, isopentyl, sec-pentyl, hexyl, octyl, isooctyl, n-decyl, trimethyloctodecyl, nonadecyl, allyl, methallyl, methyl vinyl carbinyl, butenyl, pentenyl, hexenyl, octenyl, phenyl, tolyl, xylyl, naphthyl, anthryl, sec-butylnaphthyl, dipropylnaphthyl, cyclohexenyl, vinylcyclohexenyl, tributylcyclohexyl, cyclopentenyl, and the like.

The substituted hydrocarbon radical joined to the hydroxy oxygen atom not attached to the cyclic sulfone radical of the compounds of the invention are those wherein one or more hydrogen atoms of the above-described hydrocarbon radicals has been replaced by an inorganic element or radical or by an organic radical containing one or more oxygen, nitrogen or sulfur atoms. Examples of the inorganic elements which may be attached to the hydrocarbon radicals are the halogen atoms, chlorine, bromine and iodine. Examples of the inorganic radicals are the sulfate, sulfite, nitrate and nitrite radicals. Examples of the organic radicals containing inorganic elements that may be attached to the hydrocarbon radicals are the hydroxyl, carboxyl, acyl, ether, thioether, etc., radicals.

The radical joined to the hydroxy oxygen atom other than the oxygen atom attached to the cyclic sulfone radical in the novel compounds of the invention, represented by X in the structural formula of the preferred compounds, may also be an acyl radical,

wherein R is an organic radical. Preferred organic radicals are the hydrocarbon radicals and substituted hydrocarbon radicals containing from 1 to 20 carbon atoms. The preferred hydrocarbon radicals may be cyclic or acyclic, saturated, unsaturated or aromatic. Representative examples of the hydrocarbon radicals are methyl, propyl, isobutyl, hexyl, octyl, normal decyl, octodecyl, allyl, butenyl, phenyl, naphthyl, vinylcyclohexenyl, etc. The substituted hydrocarbon radicals are those wherein one or more hydrogen atoms of the above-described hydrocarbon radicals has been replaced by an organic element or radical or by an organic radical containing one or more inorganic elements. Examples of the inorganic elements which may be directly attached to the hydrocarbon radicals are chlorine, bromine and iodine atoms. Examples of the inorganic radicals to be attached to the hydrocarbon radicals are the sulfate, sulfite, nitrate and nitrite radicals. Examples of the organic radicals containing inorganic elements that may be attached to the hydrocarbon radical are the hydroxyl, carboxyl, acyl, ether, thioether, etc. radicals.

A few examples illustrating the novel compounds of the invention are as follows:

Alpha,gamma-dimethyl-gamma-methoxybutyl 3-sulfolanyl ether
Alpha,gamma-dimethyl-gamma-ethoxybutyl 3-(2,4-dimethylsulfolanyl) ether
Alpha,gamma-dimethyl-gamma-acetoxybutyl 3-sulfolanyl ether
Alapha,alpha-dimethyl-gamma-ethoxybutyl 3-sulfolanyl ether
Alpha,alpha-dimethyl-gamma-acetoxybutyl 3-(2,4-dimethylsulfolanyl) ether
Alpha,gamma-dimethyl-gamma-butoxybutyl 3-(2-vinylsulfolanyl) ether
Alpha,gamma-dimethyl-gamma-2'-chlorobutoxy-butyl 3-sulfolanyl ether
Alpha,gamma-dimethyl-gamma-pentoxybutyl 3-(2,4-dimethylsulfolanyl) ether
Alpha,gamma-dimethyl-gamma-benzoxybutyl 3-(2-chlorosulfolanyl) ether
Alpha,alpha-dimethyl-gamma-heptoxybutyl 3-(2,4-dipropylsulfolanyl) ether
Alpha,alpha-dimethyl-gamma-benzoxybutyl 3-(2-chloro-3-ethylsulfolanyl) ether
Alpha,gamma-dimethyl-gamma-acetoxybutyl 3-(2,5-dibutylsulfolanyl) ether The novel compounds of the invention may be produced by any suitable method. The sulfolanyl ethers in which the cyclic sulfone is directly joined to a hydroxy oxygen atom of a molecule of 2-methyl-2,4-pentanediol wherein the other hydroxyl group remains as a free OH group can, for example, be produced by the addition of 2-methyl-2,4-pentanediol to the double bond of the desired sulfolene. The sulfolanyl ethers in which the cyclic sulfone is joined to a hydroxy oxygen atom of a molecule of 2-methyl-2,4-pentanediol wherein the other hydroxyl group is esterified or etherified can be produced by the addition of the 2-methyl-2,4-pentanediol to the desired sulfolene and then esterifying or etherifying the free hydroxyl group of the resulting product under the known esterification and etherification conditions for that particular type of alcohol. Alpha,gamma-dimethyl-gamma-propionoxybutyl 3-sulfolanyl ether can be produced by this method, for example, by adding 2-methyl-2,4-pentanediol to 3-sulfolene and then treating the resulting product with the acid chloride of propionic acid. Alpha,gamma-dimethyl-gamma-butoxybutyl 3-sulfolanyl ether can be prepared by the addition of 2-methyl-2,4-pentanediol to 3-sulfolene, replacing the remaining OH group of the pentanediol molecule by chlorine by reacting the product with PCl₃ and then treating the resulting chloride with butyl alcohol under suitable conditions.

Still another method for the production of the novel compounds of the invention and one especially adapted to the production of the sulfolanyl ethers wherein the free OH group is etherified is the addition of the desired monoether of 2-methyl-2,4-pentanediol to the desired cyclic sulfone. Alpha, gamma - dimethyl - gamma-butoxybutyl 3-sulfolanyl ether may be prepared by this method, for example, by addition of 2-methyl-2-butoxy-4-pentanol to 3-sulfolene. This method is not generally adaptable for use for the preparation of the sulfolanyl ethers wherein the free OH group is esterified as the alkali medium necessary for the addition of the 2-methyl-2,4-pentanediol to the sulfolene might cause excessive hydrolysis of the monoester before the addition reaction is complete.

In the esterification of the free OH group of the sulfolanyl ethers produced by the addition of the 2-methyl-2,4-pentanediol to the sulfolenes a ketene or an organic acid may be used. The organic acids are more desired as they are more easily and more economically obtained. The preferred organic acids are those substituted or unsubstituted hydrocarbon acids containing from 1 to 20 carbon atoms. The preferred acids may be cyclic or acyclic, saturated, unsaturated or aromatic. The preferred acids may be monocarboxylic acids or polycarboxylic acids. Representative examples of the preferred acids are acetic acid, propionic acid, n- and isobutyric acids, caproic, heptoic acid, caprylic acid, pelargonic acid, capric acid, lauric acid, myristic acid, pentadecanoic acid, palmitic acid, stearic acid, cyclopentane monocarboxylic acid. 3,3,4-trimethylcyclopentane-1-acetic acid, vinylacetic acid, beta-ethylacrylic acid, beta-pentenoic acid, hydracrylic acid, cresotic acid, allylacetic acid, 2-chlorobutyric acid, maleic acid, fumaric acid, citric acid, glutaconic acid, adipic acid, succinic acid, glutaric acid, pimelic acid, azelaic acid, and the like and their homologues, analogues and suitable substitution products. The polycarboxylic acids may be esterified on their other free carboxylic acid groups.

In the etherification of the free OH group of the sulfolanyl ethers produced by the addition of the 2-methyl-2,4-pentanediol to the sulfolenes, any alcohol may be used. The preferred alcohols are those substituted or unsubstituted hydrocarbon alcohols containing from 1 to 20 carbon atoms. The preferred alcohols may be cyclic or acyclic, saturated, unsaturated or aromatic. The preferred alcohols may be monohydric or polyhydric alcohols. Representative examples of the preferred alcohols are methyl alcohol, ethyl alcohol, isobutyl alcohol, allyl alcohol, butenyl alcohol, 2-chlorobutanol, cyclohexanol, phenol, ethylene glycol, glycerol, trimethylene glycol, alpha - methylglycerol, alpha - isobutylglycerol, beta-phenylglycerol, erythritol, adonitol, etc. The preferred alcohols may also be heterocyclic compounds such as 3-sulfolanol, 2,4-dimethyl sulfolanol, tetrahydrofurfuryl alcohol, thienyl alcohol, etc.

For the addition of the 2-methyl-2,4-pentanediol or its monoether to the sulfolene it is generally preferred to execute the reaction in the presence of a substantial excess of the dihydric alcohol or its monoether. The 2-methyl-2,4-pentanediol or the monoether in the reaction mixture may suitably range from two to four mols and even more for every mol of sulfolene present. The reaction will proceed, however, when the ratios of the reactants are approximately equal molar or even when there is an excess of the sulfolene.

The reaction of the 2-methyl-2,4-pentanediol or its monoether with the desired sulfolene is preferably executed in an alkaline reaction medium. The alkalinity of the reaction medium is obtained by the presence of an alkaline substance. The utilization of such an alkaline reaction medium enables the attainment of the desired novel sulfolanyl ethers and ether-esters with excellent yields free of any substantial amounts of undesirable side reaction products. Suitable alkaline substances comprise in general the more basic compounds of the alkali metals as well as certain of the strong organic bases. Suitable basic compounds include trimethylbenzylammonium hydroxide, sodium hydroxide, potassium hydroxide, sodium carbonate, potassium carbonate, lithium hydroxide, and the like. Preferred members of this group are potassium hydroxide and sodium hydroxide. The alkaline agents may be used in amounts which may vary widely within the scope of the invention. In general, an amount between about 0.1% to about 3.0%, preferably about 1.0% based upon the weight of the cyclic sulfone employed, have been found satisfactory. They may be used as such or in the form of an aqueous solution, preferably in solutions containing from about 0.1% to about 40% by weight of basic alkali metal compound. Additional amounts of the alkaline agents may be added during the course of the reaction to maintain the alkalinity of the reaction mixture.

Although the reaction between the sulfolene and 2-methyl-2,4-pentanediol or its monoether may be carried out without the presence of a solvent, it may in some cases be advantageous to carry out the reaction in the presence of a mutual solvent such as dioxane, the dimethylether of diacetone glycol, etc. Such solvents generally act as diluents or as a factor to control the temperature or flow. Buffering and stabilizing agents may also be added when needed to the reaction mixture.

The temperature of execution of the reaction of adding 2-methyl-2,4-pentanediol to a sulfolene will vary, depending upon the particular reactants employed. In general, the maximum permissible temperature will be defined by the decomposition temperature of the sulfolene employed. In the case of 3-sulfolene this is in the order of about 120° C. The lower limit will generally depend to a substantial degree upon the temperature required to initiate the reaction. This temperature generally ranges from about normal room temperature or somewhat lower, for example 20° C. to about 40° C. A preferred operating temperature range comprises a temperature in the range of, for example from about 50° C. to about 60° C.

In most cases the addition reaction may be effectively carried out at atmospheric pressures. However, subatmospheric or superatmospheric pressures may be employed if desired or necessary.

Upon completion of the addition reaction the sulfolanyl ether may be separated from the reaction mixture, which will generally include unreacted 2-methyl-2,4-pentanediol added in excess to the charge and some unreacted sulfolene by any suitable means comprising such steps as, for example, distillation, washing, solvent extraction, filtration, and the like.

If distillation is used as a means of separating the sulfolanyl ether from the reaction mixture a much smoother distillation is obtained if the unreacted sulfolene present in the reaction mixture is first hydrogenated to a sulfolane by treating the mixture with hydrogen in the presence of Raney nickel as a catalyst for a period of approximately 24 hours. The sulfolane is then easily separated from the sulfolanyl ethers or ether-esters by distillation.

The reaction is executed in any suitable type of apparatus enabling intimate contact of the reactants and control of operating conditions. The process may be carried out in batch, semi-continuous or continuous operation. When continuous operation is resorted to, reactants continuously withdrawn from the reaction zone are preferably subjected to a substantially continuous product separating operation under conditions enabling the continuous recycling to the reaction zone of separate unreacted materials together with solvents and diluents when these are employed.

The following examples are illustrative of the invention:

Example I

To a mixture of about 25 parts of NaOH and about 2252 parts of 2-methyl-2,4-pentanediol was added about 755 parts of 3-sulfolene portionwise with stirring. After the addition was complete the mixture was heated at 60° C. for 50 hours. In order to separate the final product by distillation the mixture was then treated with hydrogen in the presence of Raney nickel for 24 hours in order to convert the unused 3-sulfolene to sulfolane. The reaction mixture was then topped to remove the excess glycol and subjected to distillation at between 200–210° C. (2 mm. pressure). After standing the distillate solidified and on recrystallization from toluene gave crystals of alpha,gamma-dimethyl - gamma - hydroxybutyl 3-sulfolanyl ether having M. P. of 92° C. to 95° C. and a B. P. of 203° C. at 2 mm. pressure. Analysis showed 13.9% sulfur with the theoretical value being 13.52%.

Example II

Approximately 875 parts of the alpha,gamma-dimethyl - gamma - hydroxy - butyl 3-sulfolanyl ether produced in Example I was dissolved in toluene and the mixture was then treated with ketene, $CH_2=C=O$, for a period of approximately 16 hours. The mixture was then distilled at 168° C. at 5 mm. pressure to give 417 g. of the desired alpha,gamma-dimethyl-gamma - acetoxybutyl 3-sulfolanyl ether.

Example III

To a mixture of about 12.5 parts of NaOH and about 623 parts of the 2-methyl-2-methoxy-4-pentanol was added 368 g. of 3-sulfolene portionwise with stirring. After the addition was complete the mixture was heated to 60° C. for 45 to 50 hours. After heating the mixture was neutralized, filtered and distilled. A crude product of 209 g. was received which was redistilled at 147° C.

to 148° C. at 1 mm. pressure to give an 86% yield of the desired alpha-gamma-dimethyl-gamma-methoxybutyl 3-sulfolanyl ether. Analysis of the compound gave 13.6% S, 51.87% C and 8.7% H values compared to the theoretical values of 12.8% S, 52.85% C and 8.78% H.

*Example IV*

To a mixture of 0.31 moles NaOH and 4.71 moles of 2-methyl-2-ethoxy-4-pentanol is added 3.12 moles of 2,4-dimethyl-3-sulfolene portionwise with stirring. After the addition is complete the mixture is heated between 50° C. to 60° C. for approximately 50 hours. After heating the mixture is neutralized, filtered and distilled. The product is then redistilled to produce the desired product alpha,gamma-dimethyl - gamma - ethoxybutyl 3-(2,4-dimethylsulfolanyl) ether.

*Example V*

To a mixture of 0.7 mole NaOH and 14 moles of 2-methyl-2,4-pentanediol is added 7 moles of 2-chloro-3-sulfolene portionwise with stirring. After the addition was complete the mixture is heated between 50° C. to 60° C. for approximately 50 hours. The mixture is then distilled to give alpha,gamma-dimethyl-gamma-hydroxybutyl 3-(2-chlorosulfolanyl) ether. The sulfolanyl ether is then treated with benzoyl chloride in the presence of a dilute aqueous solution of NaOH to produce alpha,gamma-dimethyl-gamma-benzoxybutyl 3-(2-chlorosulfolanyl) ether.

*Example VI*

To approximately 0.31 mole of NaOH and 4.71 moles of 2-methyl-2-(2'chlorobutyloxy)-4-pentanol is added 3.12 moles of 2-vinyl-3-sulfolene portionwise with stirring. After the addition is complete the mixture is heated at 50° C. to 60° C. for approximately 50 hours. After heating is complete the mixture is neutralized, filtered and distilled to give alpha,gamma-dimethyl-2'chlorobutoxybutyl 3-(2-vinylsulfolanyl) ether.

*Example VII*

Following the general procedure outlined in the above examples the following compounds are also prepared; alpha,gamma-dimethyl-gamma-acetoxybutyl 3-(2,4-dimethylsulfolanyl) ether is produced by reacting 2-methyl-2,4-pentanediol with 2,4-dimethyl-3-sulfolene and treating the resulting product with ketene; alpha,gamma-dimethyl-gamma - pentoxy - butyl - 3 - (2,4 - diethylsulfolanyl) ether is produced by reacting 2-methyl-2,4-pentanediol with 2,4-diethyl-3-sulfolene and treating the resulting product with the acid chloride of pentonic acid; alpha,gamma-dimethyl-gamma-acetoxybutyl 3 - (2,5 - dibutylsulfolanyl) ether is produced by reacting 2-methyl-2,4-pentanediol with 2,5-dibutyl-3-sulfolene and treating the resulting product with ketene; alpha, gamma-dimethyl-gamma-pentoxy-butyl 3-(2,3-dipropylsulfolanyl) ether is produced by treating 2-methyl-2-pentoxy-4-hydroxy-pentane with 2,4-dipropyl-3-sulfolene.

We claim as our invention:
1. Alpha,gamma-dimethyl-gamma-hydroxybutyl 3-sulfolanyl ether.
2. Alpha,gamma-dimethyl-gamma-methoxybutyl 3-sulfolanyl ether.
3. Alpha,gamma-dimethyl-gamma-acetoxybutyl 3-sulfolanyl ether.
4. An alpha,gamma-dimethyl-gamma-alkoxybutyl 3-sulfolanyl ether having 1 to 20 carbon atoms in the alkoxy group.
5. An alpha,gamma-dimethyl-gamma-acyloxybutyl sulfolanyl ether wherein the acyloxy group is a

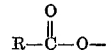

group in which R is a monovalent saturated hydrocarbon radical containing 1 to 20 carbon atoms.
6. An alpha,alpha-dimethyl-gamma-alkoxybutyl sulfolanyl ether having 1 to 20 carbon atoms in the alkoxy group.
7. An alpha,alpha-dimethyl-gamma-acyloxybutyl sulfolanyl ether wherein the acyloxy group is a

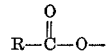

group in which R is a monovalent saturated hydrocarbon radical containing 1 to 20 carbon atoms.
8. A sulfolanyl ether of an alpha,gamma-dimethyl-alpha,gamma-dihydroxybutane of the formula

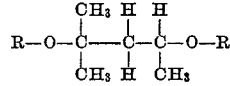

wherein one of the R's is the sulfolanyl radical and the other R is a member of the group consisting of the hydrogen atom, the monovalent saturated hydrocarbon radicals containing 1 to 20 carbon atoms and the acyl radicals of the formula

wherein R' is a monovalent saturated hydrocarbon radical containing 1 to 20 carbon atoms.

SEAVER A. BALLARD.
RUPERT C. MORRIS.

REFERENCES CITED

The following references are of record in the file of this patent:

UNITED STATES PATENTS

| Number | Name | Date |
|---|---|---|
| 2,219,006 | Delfs | Oct. 22, 1940 |
| 2,360,860 | Morris | Oct. 24, 1944 |
| 2,393,925 | Morris | Jan. 29, 1946 |
| 2,394,251 | Morris | Feb. 5, 1946 |
| 2,419,082 | Morris | Apr. 15, 1947 |